United States Patent [19]

Selvarajan

[11] 4,308,149

[45] Dec. 29, 1981

[54] BRANCHED/CROSS-LINKED CATIONIC PHENOL-FORMALDEHYDE POLYMERS USEFUL IN WASTEWATER TREATMENT

[75] Inventor: R. Selvarajan, Oak Park, Ill.

[73] Assignee: Nalco Chemical Company, Oak Brook, Ill.

[21] Appl. No.: 167,885

[22] Filed: Jul. 14, 1980

[51] Int. Cl.³ .............................................. C02F 1/56
[52] U.S. Cl. .................................. 210/736; 210/708; 210/735; 260/29.3
[58] Field of Search ............... 210/725, 727, 728, 732, 210/735, 736; 260/29.3

[56] References Cited

U.S. PATENT DOCUMENTS

| | | | |
|---|---|---|---|
| 3,290,310 | 12/1966 | Morf et al. | 162/162 |
| 3,372,129 | 3/1968 | Phillips | 210/736 |
| 3,377,274 | 4/1968 | Burke et al. | 210/727 |
| 3,634,230 | 1/1972 | Odom et al. | 210/732 |
| 3,878,136 | 4/1975 | Höfel et al. | 260/29.3 |
| 4,155,847 | 5/1979 | Tanaka et al. | 210/928 |
| 4,225,479 | 9/1980 | Hicks | 260/29.3 |

FOREIGN PATENT DOCUMENTS

| | | | |
|---|---|---|---|
| 762004 | 6/1967 | Canada . | |
| 50-27765 | 3/1975 | Japan | 210/725 |
| 51-00759 | 1/1976 | Japan | 210/727 |

*Primary Examiner*—Peter A. Hruskoci
*Attorney, Agent, or Firm*—John G. Premo; Robert A. Miller; John S. Roberts, Jr.

[57] ABSTRACT

Oily waste emulsions which cause low turbidity in industrial waste water effluents are successfully treated with cross-linked cationic polymeric compounds synthesized by reacting phenol, substituted phenol, formaldehyde and various low molecular weight polyamines having a preferred molecular weight of at least 1500 and not exceeding a molecular weight of about 30,000. The polyamines are derived from a base catalyzed polymerization of ammonia and ethylene dichloride or by the oligomerization of ethyleneimine.

6 Claims, No Drawings

BRANCHED/CROSS-LINKED CATIONIC PHENOL-FORMALDEHYDE POLYMERS USEFUL IN WASTEWATER TREATMENT

INTRODUCTION

Water treating agents for low turbidity waters have normally consisted of polymers, copolymers, and terpolymers of highly branched and cross-linked cationic nature. These materials have often been derived from the reaction of aniline, formaldehyde, and epichlorohydrin or ethylene dichloride with diaminocyclohexane as well as other multifunctional amino compounds. These cationic polymers function very well in treating low turbidity waters for recovery of residual hydrocarbons suspended in these turbid wastewaters. These materials function by apparently forming fine flocculating particulates at neutral pHs which allow the finely suspended hydrocarbon materials present in low turbidity waters to agglomerate, collect, settle, or float to the top of the aqueous media where they are collected and removed by techniques familiar to the artesan.

Examples of low turbidity waters which are treated by the use of these kinds of cross-linked cationic materials include wastewaters being expelled from hydrocarbon processing plants, wastewaters being expelled from chemical processing plants which synthesize various types of rubber latexes, and effluent waters being expelled from various kinds of processing plants using materials containing emulsified components which are of a hydrocarbon nature. Other uses for these materials include the treatment of automotive plant wastewaters which contain low quantities of highly dispersed hydrocarbon waste materials and also include wastewater effluents from machining plant operations which normally include highly dispersed lubricant oils and other emulsifiers which are used in the machining of metal parts of various natures.

It is these kinds of oily waste emulsions which have been particularly difficult to treat in an economic fashion in recent times.

Previous work with aniline-formaldehyde polymer systems has been successful when difunctional amines such as diaminocyclohexane and hexamethylenediamine have been used to react simultaneously with the aniline-formaldehyde polymeric system. These compounds show a range of activities which are quite excellent in the treatment of the oily waste waters mentioned in previous paragraphs. Compounds derived by the reaction of aniline-formaldehyde polymeric systems with other polyamines also have given excellent activity in the treatment of these oily wastewaters. The technology for treating low turbidity waters with cationic polymers based on aniline and aniline-formaldehyde compounds reacted with amines or polyamines derived from epitchlorohydrin, ethylene dichloride, difunctional amines, diaminocyclohexane, or other polyamine compounds, is the subject of a pending patent application, Ser. No. 138,045, filed Apr. 7, 1980, and herein incorporated by reference.

Although these aniline/formaldehyde reacted materials show excellent activity in the treatment of low turbidity waters, their production provides several problems on which improvement can be sought. These problems include the use of aniline which is highly toxic and is suspected as being a potential carcinogen. In addition the aniline materials used as precursors or the polycationics useful to treat turbid wastewaters may also be both expensive as well as toxic.

Therefore, it would be an advance in the art if one were able to come up with a less expensive, less toxic material either in its final form or in its precursor form which would be useful in the treatment of low turbidity waters to recover waste hydrocarbons as well as prepare a process plant water effluent for discharge to public waterways.

THE INVENTION

The instant invention covers a process for clarifying industrial wastewaters having low turbidity which comprises treating these wastewaters with at least 5 ppm of a branched/cross-linked polymer which is the reaction product of a phenol, formaldehyde, and a low molecular weight polyamine chosen from the group consisting of the polymeric reaction products derived from reacting ammonia and ethylene dichloride and the oligomers of ethyleneimine. By the term branched/cross-linked polymer is meant that mixture of compounds which would be formed by the reaction of the phenol material used in these reactions with formaldehyde and the low molecular weight polyamine indicated in the previous paragraph. The term branched/cross-linked is used to indicate that it is difficult to determine under the reaction conditions whether the polymers obtained are simply branched polymers or whether they are cross-linked polymers. Both forms of these materials would be and are expected to be present in the reaction mixtures isolated by the practice of this invention. Applicants fully expect that these materials would function if it were possible to isolate either a branched material exclusively or a cross-linked material exclusively.

The compounds specifically found to be useful in this invention have not been treated in any way so as to accomplish a separation of exclusively branched polymer structures or exclusively cross-linked polymers. The compounds are the natural mixture of branched and/or cross-linked polycationics expected from the use of the reaction conditions taught within this invention.

The branching and/or cross-linking of various polyamines has been successfully carried out with phenol and formaldehyde. A polymer derived from the reaction of phenol-formaldehyde-low molecular weight polyamine is found to have comparable activity in clarifying industrial wastewaters derived from petroleum processing plants as well as other types of processing plants relative to standard control compounds which have been synthesized from aniline-formaldehyde-low molecular weight polyamines. These compounds have been demonstrated to have excellent thermal stability with low levels of residual phenol and cost-performance data comparable to the aniline-formaldehydepolyamine products previously known in the art.

THE POLYAMINES

The polyamines normally used in the reactions mentioned above which achieves a cross-linked and/or branched material used successfully to clarify low turbidity wastewaters containing hydrocarbon waste materials are normally obtained by reacting ethylene dichloride with ammonia under conditions such that the molecular weights of these polyamines are at least 500 but do not exceed 500,000. A preferred molecular weight of the polyamine to be reacted with phenol-formaldehyde is at least 1,000 but not exceeding 50,000. These polyamines may themselves be three dimensionally branched but are, for the most part, linear polymers without cross-linked chemical bonds. A most preferred molecular weight range of the polyamines used to obtain the polymers of the instant application are those polyamines obtained by reacting ethylene dichloride and ammonia to achieve a molecular weight of at least 1,500 but not exceeding 30,000.

In addition, the polyamines obtained by polymerizing ethyleneimine have also been found to be active in the instant application. A particularly useful polyamine is derived by reacting ethyleneimine to obtain an oligomer referred to as tetraethylenepentamine (TEPA). When this tetraethylenepentamine is reacted with appropriate ratios of phenol and formaldehyde, a branched/cross-linked terpolymer is formed which has high activity in treating industrial wastewaters of low turbidity to clarify these waters and to isolate waste hydrocarbon values causing the turbid character observed in these wastewaters. In addition to the TEPA materials, other polyethyleneimine compounds can be used to obtain active branched/cross-linked terpolymers with phenol-formaldehyde reactions.

THE REACTION

Unless otherwise stated all the cationic phenolics which appear in this application were synthesized by reacting the methylolated amine or polyamine with phenol for a period of 5 to 6 hours at reflux temperatures which varied between 97 and 100 degrees Centigrade depending on atmospheric conditions. The polyamines were supplied at neutral pHs upon treatment with formaldehyde to effect methylolation, and subsequently became acidic (pH 2.0–4.0) due to the presence of an oxidized formic acid contaminant. It was therefore not necessary to add additional acid catalysts to effect the branching/cross-linking of the methylolated amine or polyamine with the phenol. However, after completing the polymerization reactions, adequate amounts of concentrated hydrochloric acid were invariably used to render the product fluid and homogeneous prior to its being tested in the clarification of low turbidity waters. As a representative example of the procedures used, Example I follows:

EXAMPLE I

Into a one liter, 3-necked polymer flask fitted with a stirrer, condenser, and addition funnel, was charged 107 parts of a low molecular weight polyamine which in turn was derived by reacting ethylene dichloride and ammonia to achieve a low molecular weight polyamine having an average molecular weight of approximately 1500. Forty percent of the charge to the polymer flask was actually the low molecular weight polyamine. These polyamines are usually synthesized by procedures taught in U.S. Pat. No. 3,372,129 or in Canadian Pat. No. 762,004 which are both herein incorporated by reference. After the 107 parts of this polyamine solution was charged to the polymer flask, an additional 175 parts of water was added followed thereby by the addition of 60.6 parts of formaldehyde.

This mixture was heated, with agitation, to 60° C. for approximately 15 minutes. Following this preheating, 47 parts of phenol and an additional 100 parts of water were added to the mixture contained in the polymer flask. Following the addition of phenol, the flask contents were heated to reflux for approximately 1 hour. An additional 200 parts of water was added to this reaction mixture and the reflux conditions of this reaction were maintained for the next 16 consecutive hours.

After this 16 hour reflux and reaction time was completed, the reaction mixture had a pH of 3.0. To this reaction mixture was added 10 parts of concentrated hydrochloric acid which dropped the reaction mixture contents to a pH of 1.2. The flask contents appeared as a hazy brown solution and on analysis contained 14.1% polymer solids which in turn were determined by colloid titration to contain 61.4% cationic charge density. This reaction product will be referred to hereinafter as Polymer A.

Polymer A was added to an industrial wastewater having low turbidity and hydrocarbon contamination. The addition of 5 ppm of Polymer A to this industrial wastewater derived a partial clarification of the same. The addition of 20 ppm of Polymer A to this same wastewater derived complete clarification, isolation of the hydrocarbon values present in the wastewater, and separation of a water layer which was free of visible turbidity and sufficiently free of hydrocarbon values to meet the required effluent standards set by the environmental protection agencies.

The data in Table I presents a series of amine modified phenolformaldehyde polymers which were synthesized using procedures essentially identical to the procedures outlined above. The primary differences that are observable are the differences in the low to intermediate molecular weight polyamine that was initially used, the differences in the mole ratios of phenol:polyamine:formaldehyde, and some slight differences in reaction conditions. Product stability, residual phenols remaining in the recovered polymeric solution, and activity for clarification of industrial wastewater when compared with a standard material as well as other observations made during the reaction is also presented in the table. The materials in Table 1 cannot be used as products for the clarification of low turbidity waters when gellation occurs or when the reaction product formed is insoluble in water.

TABLE I

AMINE MODIFIED PHENOL-FORMALDEHYDE POLYMERS

| | NAME OF | | MOLE RATIO OF | REACTION | | | | | PRODUCT | | | | WASTEWATER ACTIVITY | | |
|---|---|---|---|---|---|---|---|---|---|---|---|---|---|---|---|
| PHENOLS | AMINES | | PHENOL:AMINE$\phi$:F | CONC. % | pH | T °C. | t, Hrs. | CONC. % | pH | STABILITY @ 60° C./d | RESIDUAL PHENOLS % | WASTEWATER | r/ro | REMARKS |
| Phenol | EDC—NH$_3$ (1500) | | 1:2:1.5 | 14.35 | 1.8 | 150 | 21.0 | 14.14 | 1.2 | >66 | 0.57 | | 1.03 | Cost-performance = 0.7–0.9 compared to standard |
| Phenol | EDC—NH$_3$ (1500) | | 1:2:1.5 | 33 | 3.3 | 95 | 6.0 | 32.5 | 0.2 | >10 | 4.0 | | 6.0 | |
| Phenol | EDC—NH$_3$ (1500) | | 3:4:5 | 30 | 2.5 | 95 | 3.0 | 20.1 | 0.5 | — | — | | — | Insoluble resin formed on standing |
| Phenol | EDC—NH$_3$ (1500) | | 1:2:2 | 26 | 1.4 | 97 | 5.0 | 25.5 | 1.5 | 2.5 | 1.5 | | 1.76 | |
| Phenol | EDC—NH$_3$ (1500) | | 1:2:2 | 32 | 1.4 | 97 | 5.0 | 31.38 | 0.5 | 2.5 | 0.8 | | 1.42 | |
| Phenol | EDC—NH$_3$ (1500) | | 1:2:1.5 | 17.5 | 2.3 | 80 / 99 | 1.0 / 3.0 | | | | | | — | Insoluble solids separated |
| Phenol | EDC—NH$_3$ (5000) | | 1:2:1.5 | 14.48 | 2.7 | 80 / 99 | 0.5 / 6.0 | 14.48 | 0.7 | — | 1.7 | | 1.32 | Split F charge, 84 & 16% was carried out |
| Phenol | EDC—NH$_3$ (5000) | | 1:2:1.5 | 17.5 | 2.1 | 80 / 99 | 1.0 / 6.0 | 14.8 | 0.6 | — | — | | — | Insoluble solids separated |
| Phenol | EDC—NH$_3$ (5000) | | 1:2:1.5 | 14.42 | 2.2 | 80 / 99 | 0.5 / 6.0 | 14.42 | 0.6 | — | 1.2 | | 1.9 | 84 & 16% F split charge |
| Phenol | EDC—NH$_3$ (5000) | | 1:2:1.5 | 19.6 / 15.0 | 2.1 / 3.3 | 98 / 98 | 3.0 / 3.0 | 15.0 | 0.5 | >20 | 1.3 | | 1.48 | |
| Phenol | EDC—NH$_3$ (20,000) | | 1:2:1.5 | 19.6 / 15.0 | 2.3 / 3.5 | 98 / 98 | 3.0 / 3.0 | 15.0 / 15 | 0.4 / 0.2 | >20 / — | 1.6 / — | | 2.05 | |
| Phenol | EDC—NH$_3$ (30,000) | | 1:2:1.25 | 15 | 1.5 | 98 | 6.0 | | | | | | — | Insoluble Solids separated |
| Phenol | EDC—NH$_3$ (40,000) | | 1:2:1.5 | 14.8 / 11.5 | 2.1 / 2.1 | 98 / 98 | 1.5 / 5.0 | 11.5 / 14.8 | 0.5 / 0.2 | >20 / — | 0.83 / — | | 1.7 | |
| Phenol | EDC—NH$_3$ (40,000) | | 1:2:1.25 | 14.8 | 2.2 | 98 | 6.0 | | | | | | — | Insoluble solids separated |
| Phenol | EDC—NH$_3$ (40,000) | | 1:2:1.5 | 14.8 / 11.5 | 2.3 / 2.3 | 98 / 98 | 1.5 / 5.0 | 6.78 | 0.7 | >20 | 0.75 | | >2.6 | Small quantity of insoluble solids separated |
| Phenol | EDC—NH$_3$ (50,000) | | 1:2:2 | 30 | 4.0 | 97 | 6.0 | — | — | — | — | | — | Gel was formed |
| Phenol | EDC—NH$_3$ (5000) | | 3:4:5 | 30 | 3.5 | 97 | 3.0 | — | — | — | — | | — | Insoluble resinous product obtained |
| Phenol | EDC—NH$_3$ (5000) | | 1:2:2 | 23 | 2.3 | 97 | 5.0 | 15.8 | 1.5 | >12 | 1.3 | | 1.51 | |
| Phenol | EDC—NH$_3$ (5000) | | 1:2:1.6 | 31 | 2.1 | 97 | 6.0 | 9.93 | 0.7 | >10 | 4.1 | | 1–76 | |
| Phenol | EDC—NH$_3$ (10,000) | | 1:2:2 | 15 | 2.7 | 97 | 5.0 | 14.49 | 1.1 | >12 | 0.8 | | 1.35 | |
| Phenol | EDC—NH$_3$ (10,000) | | 1:2:1.6 | 31.3 | 3.2 | 97 | 6.0 | 29.8 | 0.2 | >10 | 3.2 | | 1.43 | |

TABLE I-continued
AMINE MODIFIED PHENOL-FORMALDEHYDE POLYMERS

| PHENOLS | NAME OF AMINES | MOLE RATIO OF PHENOL:AMINEφ:F | REACTION CONC. % | pH | T °C. | t, Hrs. | PRODUCT CONC. % | pH | STABILITY @ 60° C./d | RESIDUAL PHENOLS % | WASTEWATER ACTIVITY r/ro | REMARKS |
|---|---|---|---|---|---|---|---|---|---|---|---|---|
| Phenol | EDC—NH₃ (50,000) | 1:2.5:2 | 26.88 | 1.8 | 95 | 2 | — | — | — | — | — | Gelation ensued |
| Phenol | EDC—NH₃ (50,000) | 1:3.3:2 | 15.9 | 2.7 | 80 96 | 1.0 7.0 | — | — | — | — | — | Insoluble solids separated |
| Phenol | EDC—NH₃ (50,000) | 1:3:1.5 | 25 | 2.6 | 80 | 1.0 | — | — | — | — | — | Gelation ensued |
| Phenol | EDC—NH₃ (50,000) | 1:3:1.5 | 15.6 15.6 10.0 25 | 3.5 3.5 3.5 3.5 | 80 100 100 80 | 1.0 1.0 8.0 1.5 | — — — 10 | — — — 3.5 | — | — | 3.2 | Gelation ensued |
| Phenol | EDC—NH₃ (50,000) | 1:5:1.5 | 15 | 4.0 | 98 | 4.0 | 14.4 | 1.2 | — | — | 0 | Gelation ensued |
| Phenol | EDC—NH₃ (50,000) | 1:5:2 | 20 | 3.3 | 80 96 | 1.0 0.5 | — | — | — | — | — | Gelation ensued |
| Phenol | EDC—NH₃ (50,000) | 1:6:2 | 10 | 3.3 | 80 96 | 0.5 4.0 | — | — | — | — | — | Gelation ensued |
| Phenol | EDC—NH₃ (50,000) | 1:6:2.5 | 12.1 | 3.3 | 80 96 | 0.5 4.0 | 12.1 | — | — | — | — | Gelation ensued |
| Phenol | EDC—NH₃ (50,000) | 1:2:1.5 | 20 | 3.0 | 80 | 0.1 | — | — | — | — | — | Instantaneous resinification |
| Phenol | EDC—NH₃ (80,000) | 1:4:1.5 | 13.1 | 4.7 | 80 98 80 | 1.0 3.0 0.5 | 10.12 — | — | — | — | 0 | Gelation ensued |
| Phenol | EDC—NH₃ (80,000) | 1:6:2 | 13.1 | 4.3 | 80 | — | — | — | — | — | — | |
| Phenol | TEPA | 2:5:1.5 | 25.7 | 1.3 1.3 | 80 98 | 2.0 2.0 | 16.8 | 1.8 | — | — | >1.2 | Insoluble solids separated |
| Phenol | TEPA | 2:1:4 | 20 | 2.1 | 98 | 1.0 | 20.0 | 2.1 | — | 2.3 | >1.0 | |
| Phenol | TEPA | 2:1:5 | 19.8 | 2.0 | 80 | 3.0 | 19.8 | 2.0 | — | 0.94 | — | Cost-performance 1.2 |
| Phenol | TEPA | 3:2:5 | 19.35 | 3.5 | 80 | 1.0 | — | — | — | — | — | |
| Phenol | TEPA | 2:2:3 | 21.17 21.17 | 5.0 5.0 | 80 98 | 10.0 1.0 | 14.54 | 2.4 | — | — | 0 | Insoluble solids separated |
| Phenol | TEPA | 2:1:4 | 25 | 2.8 | 96 | 11.0 | 21.17 | 5.0 | — | — | — | |
| Phenol | TEPA | 2:1:5 | 24.57 | 2.5 | 96 | 15.0 | 25 | 3.7 | >10 | 2.4 | 2.62 | |
| Phenol | TEPA | 2:1:4 | 31.12 | 2.7 | 80 | 11.0 | 24.57 | 3.7 | 2.0 | 0.78 | 1.26 | |
| Phenol | TEPA | 2:1:5 | 31.0 | 2.7 | 96 | 14.0 | 31.12 | 2.7 | — | 2.1 | 2.5 | |
| Phenol | TEPA | 2:1:4 | 30.3 | 2.1 | 97 | 7.5 | 31.0 | 2.5 | — | — | — | |
| Phenol | TEPA | 2:1:5 | 33.33 | 2.2 | 90 | 19.0 | 30.3 | 3.2 | — | 1.4 | 2.12 | Gel was formed |
| EO₂P* | TEPA | 2:1:4 | 32.8 | 2.2 | 98 | 3.0 | 33.33 | 2.2 | 2.5 | >3.2 | >5 | 54.5% cationic charge HLB of the phenol = 9.4 |
| EO₄nP** | TEPA | 2:1:5 | 28.5 | 1.2 | 80 | 1.0 | 32.8 | 2.2 | — | >3.0 | — | Insoluble nP separated |
| EO₄nP | TEPA | 1:1:2 | 23.8 | 1.9 | 98 96 | 5.0 1.0 | — | — | — | — | — | |
| EO₄nP | TEPA | 1:1:1.5 | 25.0 | 1.9 | 80 98 | 5.0 2.5 | — | — | — | — | — | Insoluble nP separated |
| EO₆nP | TEPA | 1:1:1.5 | 25.6 | 1.9 | 98 80 | 16.0 0.5 | — | — | — | — | — | Insoluble nP separated HLB of the phenol = 10.6 |

TABLE I-continued

AMINE MODIFIED PHENOL-FORMALDEHYDE POLYMERS

| NAME OF | | MOLE RATIO OF | REACTION | | | | PRODUCT | | | ACTIVITY | |
|---|---|---|---|---|---|---|---|---|---|---|---|
| PHENOLS | AMINES | PHENOL:AMINE$^{\phi}$:F | CONC. % | pH | T °C. | t, Hrs. | CONC. % | pH | STABILITY @ 60° C./d | RESIDUAL PHENOLS % | WASTEWATER | r/ro | REMARKS |
| t.Bu. Phenol | TEPA | 1:1:2 | 18.5 | 6.4 | 98 | 16 | — | — | — | — | | — | Insoluble nP separated |
| Phenol | TEPA | 2:1:4 | 21.17 | 2.0 | 98 | 2.0 | 18.5 | 6.4 | — | — | | — | Insoluble solids formed |
| p-Cresol | TEPA | 2:1:3 | 21.42 | 2.0 | 98 | 1.0 | 21.1 | 2.0 | — | — | | — | Resinous product separated |
| p-Cresol | HMDA | 1:2:3 | 25.3 | 0.2 | 80 | 3.0 | 21.4 | 2.0 | — | — | | — | Resinous product separated |
| Phenol | ED | 1:1:2 | 20.0 | 1.8 | 80 | 2.0 | — | — | — | — | | — | Resinous product separated |
| | | | | | 99 | 4.0 | | | | | | | Insoluble solids separated |

$^{\phi}$For polyamines the mer weight is considered in place of molecular weight
ro = Activity of standard; analine-TEPA-formaldehyde polymer, 20.5% solids
*Ethoxylated phenol containing one mole of EO per mole of phenol
**Nonyl phenol containing four moles of EO Close examination of the contents of Table I indicates that successful molecules capable of clarifying low turbidity industrial wastewaters are manufactured by a process which allows the recovery of either branched or cross-linked cationic polymers or mixtures thereof formed by the reaction of phenols, substituted phenols, formaldehyde, and various low molecular weight polyamines or various low molecular weight oligomers of ethyleneimine. In some cases the ratios of the reactants must be carefully controlled so as to achieve a water soluble product which has activity in the clarification of these types of wastewaters.

Having described my invention, I claim:

1. A process for removing turbidity from low turbidity industrial wastewaters which comprises treating said wastewaters by adding an effective turbidity removing amount of a water-soluble polymer to said wastewaters, admixing to flocculate the turbidity and then removing the flocculated turbidity, said water-soluble polymer consisting essentially of a reaction product of a phenol, formaldehyde, and a low molecular weight polyamine derived solely from reacting ammonia and ethylene dichloride to obtain a polyamine having a molecular weight between 500 and 500,000, said reaction product being obtained by reacting the phenol, formaldehyde, and polyamine in the following manner:
  A. Reacting the polyamine with formaldehyde to form methylolated polyamine;
  B. Reacting the thus formed methylolated polyamine with a phenol, in aqueous solution and under acidic conditions below a pH of 4.0 at an effective temperature and for a sufficient time to form said polymer; and
  C. Adding sufficient acid to render the polymer, in aqueous solution, fluid and homogeneous; said reaction being carried out at molar ratios of the phenol, formaldehyde, and polyamine of between 1:2:1.5 and 1:2:2.

2. The method of claim 1 wherein the phenol, formaldehyde, and polyamine are reacted in a molar ratio of 1:2:1.5, said molar ratio of polyamine being calculated on the mer unit within the polyamine.

3. A method of claim 2 wherein the polyamine has a molecular weight between 1,000 and 30,000.

4. A process for removing turbidity from low turbidity industrial wastewaters which comprises treating said wastewaters by adding an effective turbidity removing amount of water-soluble polymer to said wastewaters, admixing to flocculate the turbidity and then removing the flocculated turbidity, said water-soluble polymer consisting essentially of a reaction product of a phenol, formaldehyde, and tetraethylene pentamine, said reaction product being obtained solely by reacting the phenol, formaldehyde, and tetraethylene pentamine in the following manner:
  A. Reacting the tetraethylene pentamine with formaldehyde to form methylolated tetraethylene pentamine;
  B. Reacting the thus formed methylolated polyamine with a phenol, in aqueous solution, under acidic conditions below a pH of 4.0 at an effective temperature and for a sufficient time to form said polymer; and
  C. Adding sufficient acid to render the polymer in aqueous solution, fluid and homogeneous; said reaction being carried out at molar ratios of the phenol, formaldehyde, and polyamine between 2:1:4 and 2:1:5.

5. The method of claim 4 wherein the phenol, formaldehyde, and tetraethylene pentamine are reacted in a molar ratio of 2:1:4.

6. The method of claim 1 or claim 4 wherein the phenol is chosen from the group consisting of phenol, ethoxylated phenol containing one mole of ethylene oxide per mole of phenol, ethoxylated nonyl phenol containing four moles of ethylene oxide per mole of nonyl phenol, t-butyl phenol, and p-Cresol.

* * * * *